United States Patent [19]
Yamamoto

[11] Patent Number: 5,145,555
[45] Date of Patent: Sep. 8, 1992

[54] METHOD OF MANUFACTURING A MAGNETIC HEAD

[75] Inventor: Tatsushi Yamamoto, Ikoma, Japan

[73] Assignee: Sharp Kabushiki Kaisha, Osaka, Japan

[21] Appl. No.: 671,418

[22] Filed: Mar. 19, 1991

[30] Foreign Application Priority Data

Mar. 19, 1990 [JP] Japan ................ 2-70962

[51] Int. Cl.⁵ .............. B44C 1/22; C03C 15/00; C23F 1/00
[52] U.S. Cl. ................... 156/643; 156/633; 156/645; 156/656; 156/663; 360/122
[58] Field of Search ............ 29/603; 427/38, 128, 427/129, 130, 132; 360/84, 119–122, 125–127, 130.21; 156/633, 643, 645, 654, 656, 663, 659.1

[56] References Cited

FOREIGN PATENT DOCUMENTS

| 80512 | 4/1986 | Japan . |
| 33709 | 2/1989 | Japan . |
| 1-13909 | 5/1989 | Japan . |
| 211309 | 8/1989 | Japan . |
| 235011 | 9/1989 | Japan . |
| 40117 | 2/1990 | Japan . |

Primary Examiner—William A. Powell
Attorney, Agent, or Firm—David G. Conlin; Robert M. Asher

[57] ABSTRACT

A method of manufacturing a magnetic head including the steps of forming a plurality of almost V-shaped parallel grooves in a surface of a substrate; forming a soft magnetic thin film larger in thickness than that required for a track width in one well of each of the grooves; processing the soft magnetic thin film at the top portion of the groove walls to a thickness required for the track width by ion milling utilizing a self-shadowing effect of the top portion of the groove walls; filling the grooves with nonmagnetic substance; and performing a finishing process required for completing a magnetic head including the steps of cutting, shaping, polishing, bonding, etc.

13 Claims, 12 Drawing Sheets

METHOD OF MANUFACTURING A MAGNETIC HEAD

BACKGROUND OF THE INVENTION

1. Field of the Invention

The present invention relates to a method of manufacturing a magnetic head, and more specifically, it relates to a method of manufacturing a rotary magnetic head used in a system like a VCR (Video Cassette Recorder), an R-DAT and the like.

2. Description of the Prior Art

In recent years, with a trend towards high-density recording and wide-band signal processing in a magnetic recording technique, a medium having a high concave force, such as a metal tape and the like, has been used as a recording medium. For this reason, a thin film of a soft magnetic alloy having a high saturation magnetic flux density is used as a core material of a magnetic head. As shown in FIG. 5, for instance, there has been proposed a magnetic head 20 having a soft magnetic alloy thin film 13 sandwiched between nonmagnetic substrates 17.

In a magnetic head 20 having a core of the soft magnetic alloy thin film 13, its track width is defined by the thickness of the thin film 13. With a magnetic head having a track width of 10 μm or under which offers a higher recording density, however, it is difficult to maintain a sufficient core efficiency of its core because the entire core is formed of the thin film 13, which leads to high magnetic reluctance.

As disclosed in Japanese Unexamined Patent Publication No. 33709/1989, the inventors of the present invention have proposed that the thickness of a magnetic head core (i.e., thickness of a soft magnetic alloy thin film) should be so designed to be equivalent to a track width in a gap portion while it should be larger than the track width in any portion away from the gap portion.

FIG. 6 shows a magnetic head 21 disclosed in the above Patent Publication, while FIG. 7 shows a method of manufacturing the same.

In FIGS. 6(a) and 6(b), a soft magnetic alloy thin film 23 has a thickness required for a track width in a gap portion 22 while it is thicker in other portions.

The magnetic head thus structured, as shown in FIGS. 7(a) through 7(h), includes a V-shaped groove 31 formed in a nonmagnetic substrate 27 at a specified pitch. A soft magnetic alloy thin film 23 is formed on an inclined side 29 of the groove 31 to have a larger thickness than that required for obtaining a track width of the magnetic head 21; thereafter, a resist pattern 42 is formed covering the soft magnetic alloy thin film 23 except for a top portion 32 of the V-shaped groove, and an exposed-portion of the soft magnetic alloy thin film 23 is etched to a thickness required for the track width to obtain a body 43. After glass 28 is molded in the body 43, the body 43 is finished into a magnetic head having a tape contact face as shown in FIG. 7(h) by a well-known magnetic head manufacturing process of cutting, shaping, polishing, glass bonding, cylindrical grinding, tape polishing and the like.

However, the photoresist can not be uniformly coated on and adhere to the substrate 27 because it does not assume a plane; thus, there arises the problem that the resist pattern has a poor accuracy.

As a related art, the following conventional embodiments are known: a magnetic head employing a soft magnetic thin film as a core, in which a track width and a rate of a front core thickness to a back core thickness are controlled depending upon a thickness of a film deposited on a substrate, so that a mechanically strong gap is implemented and a decline of a reproducing sensitivity because of a narrowed track is prevented (see Japanese Unexamined Patent Publication No. 80512/1986); a magnetic head which is so configured that a track width is smaller in size than a core thickness in order to increase a sectional area of a magnetic metal of a back core, whereby an increase in magnetic reluctance because of a narrowed track width is eased (see Japanese Unexamined Patent Publication No. 113909/1989); a magnetic head in which a surface portion of a tape sliding face is made simply of a magnetic substance, a track width in a gap portion is determined depending upon a nonmagnetic substance, and a width of a core formed of laminated film of magnetic films and nonmagnetic films is made thicker than the track width in the gap portion, so that magnetic reluctance of the core is reduced to enhance a reproducing efficiency (see Japanese Unexamined Patent Publication No. 211309/1989); a method of manufacturing a magnetic head, in which a core thickness in a portion other than a portion near a gap is made larger than a track width, so that a magnetic reluctance is reduced to enhance a recording/reproducing efficiency (see Japanese Unexamined Patent Publication No. 235011/1989); and a magnetic head in which a core thickness on the back side is made twice or more as large as a core thickness on the front side, so that a gap and a track are narrowed to improve an electromagnetic transducing property and a recording/reproducing property (see Japanese Unexamined Patent Publication No. 40117/1990).

SUMMARY OF THE INVENTION

The present invention is accomplished to overcome disadvantages of the above mentioned prior arts, and an object thereof is to provide a method of manufacturing a magnetic head in which an ion milling is employed for processing a gap portion of a soft magnetic alloy thin film formed on an inclined side of a V-shaped groove in a nonmagnetic substrate and a self shadowing effect of the top portion of the V-shaped groove is utilized.

Thus, the present invention provides a method of manufacturing a magnetic head comprising the steps of forming a plurality of almost V-shaped parallel grooves in a surface of a substrate; forming a soft magnetic thin film larger in thickness than that required for a track width on one wall of each of the grooves; processing the soft magnetic thin film at the top portion of the groove walls to a thickness required for the track width by ion milling utilizing a self-shadowing effect of the top portion of the groove walls; filling the grooves with nonmagnetic substance; and performing a finishing process required for completing a magnetic head including the steps of cutting, shaping, polishing, bonding, etc.

According to the present invention, an ion milling is employed for processing a soft magnetic thin film on the top portion of a wall surface of each groove to be a gap portion; this means the directions of incident beams contributing to the milling are uniform. Thus, a self shadowing effect of the top of the wall surface of each groove is utilized in performing the ion milling to process the soft magnetic alloy thin film; therefore, there is no need of the step of forming a resist pattern.

DETAILED DESCRIPTION OF THE PREFERRED EMBODIMENTS

The present invention will now be described in detail in conjunction with an embodiment shown in the accompanying drawings; the present invention is not precisely limited to the disclosure.

In an embodiment, a soft magnetic alloy thin film is an FeAlSi alloy thin film, while a magnetic substrate is made of crystalline glass. As the soft magnetic alloy thin film, for example, an NiFe alloy thin film, an FeSiGa alloy thin film, a CoNbZr alloy thin film or the like may be used; as the nonmagnetic substrate, a ceramics substrate may be used. The material of the substrate is appropriately determined in accordance with an agreement in thermal expansion with a soft magnetic material and an abrasion characteristic.

As an nonmagnetic substance with which the grooves of the substrate is filled, preferably used are those having substantially the same abrasion as the substrate and capable of filling the grooves in a temperature range (about 600° C.-700° C.) in which the substrate is not deformed; mainly, a low-melting-point glass is used.

For ion milling, a well-known ion milling device is used. As the ion milling device, ion milling devices manfactured by Common Wealth Scientific Co., Ltd., Hitachi Ltd., etc. may be used. In this embodiment, the ion milling device manufactured by Common Wealth Scientific Co., Ltd. was employed. The milling was performed by radiating argon ions in a vacuum of about $10^{-4} - 10^{-6}$ Torr with the substrate cooled by water.

In this embodiment, as first and second soft magnetic thin films of the soft magnetic thin film multi-layer body, FeAlSi alloy thin films were used; instead any alloy thin films of NiFe, FeSiGa, CoNbZr, etc. may be used, or the first and second alloy thin films may be different kinds of thin films from each other.

As a metal thin film which is a component of the soft magnetic thin film mult-layer body and serves as a mask against ion milling, titanium is mainly used regardless of any material of the soft magnetic thin film such as NiFe, FeSiGa, CoNbZr or the like.

Figure 1A:
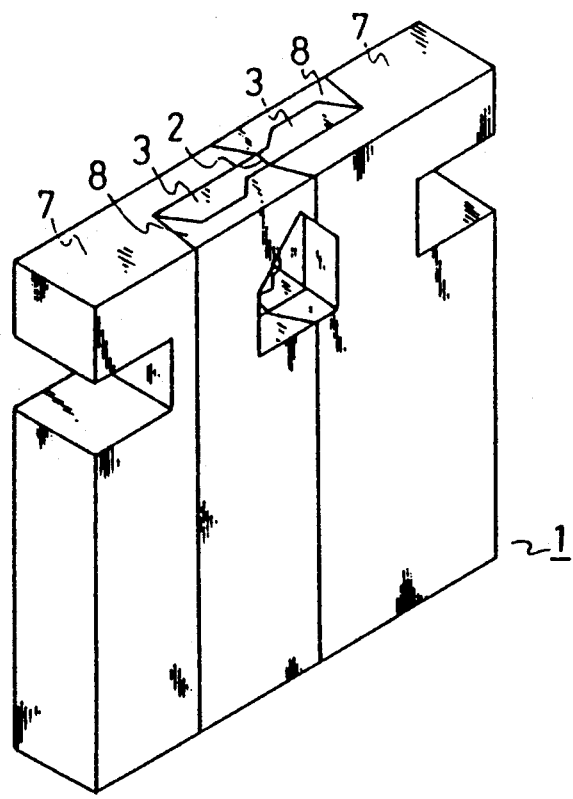
FIGS. 1(a) and 1(b) are perspective views showing a magnetic head of an embodiment according to the present invention.
Figure 1B:
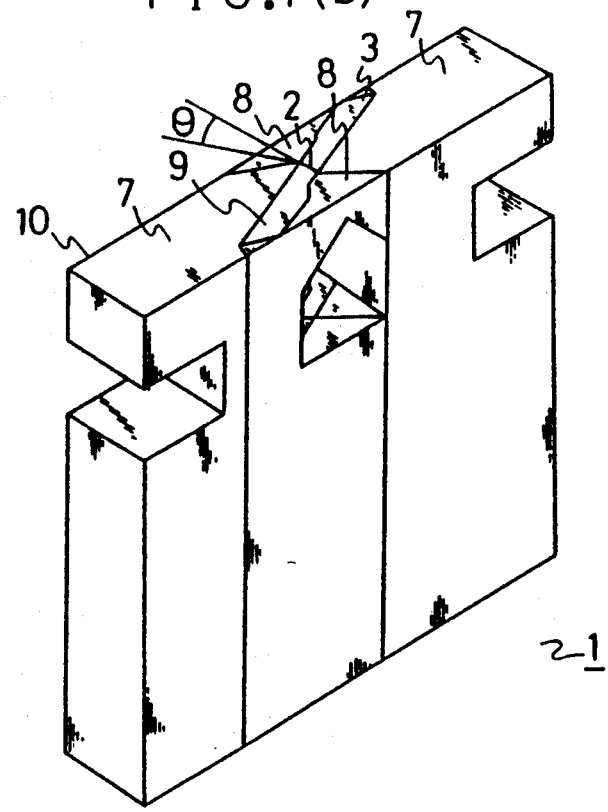

FIGS. 1(a) and 1(b) are perspective views showing an embodiment of a magnetic head obtained according to the present invention. These figures are enlarged in thickness and in portions around a gap portion 2.

As shown in FIG. 1(a), a soft magentic alloy thin film 3 of FeAlSi has a thickness necessary for a track width in the gap portion 2, but is larger in thickness in other parts.

On the other hand, as a placed structure, the soft magnetic alloy thin film 3 is sandwiched between a nonmagnetic substrate 7 of crystalline glass and a low melting point glass equivalent in abrasion to the nonmagnetic substrate 7. Depending upon the shape and pitch of a V-shaped groove later mentioned, as shown in FIG. 1(b), a plane 9 where the soft magnetic alloy thin film 3 is formed and an edge line 10 of an upper portion of the magnetic head get slanted. The gap 2 is bonded by the low melting point glass 8. Coiling wire wound around the magnetic head 1 and a gap spacer are omitted in the drawings.

Then, a method of manufacturing the magnetic head 1 will be explained with reference to FIGS. 2(a) through 2(i).

Figure 2A:
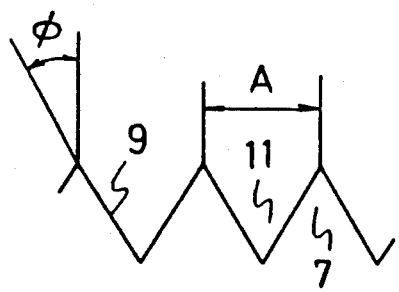
FIGS. 2(a) through 2(i) are diagrams for explaining a manufacturing process of the embodiment according to the present invention.

As shown in FIG. 2(a), a V-shaped groove 11 is formed in the surface of the substrate 7 of crystalline glass with a pitch A allowing for an eventual thickness of the magnetic head and a margin to cut off. An angle $\phi$ between a side wall 9 of the V-shaped groove 11 where the soft magnetic alloy thin film 3 serving as a core is to be formed and a normal line in the initial surface of the substrate 7, and the pitch A are determined by the width of the core required for the intended magnetic head 1 and an azimuth.

Figure 2D:
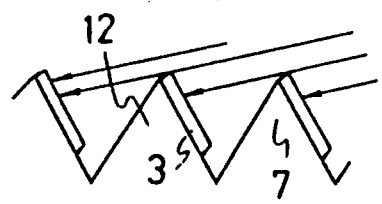
Figure 2B:
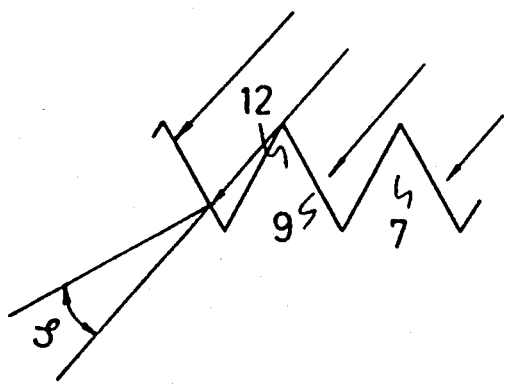
Figure 2E:
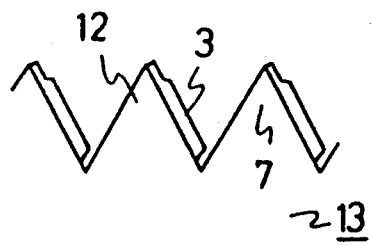
Figure 2C:
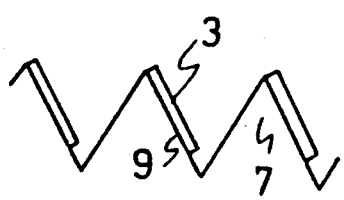

Then, as shown in FIG. 2(c), the FeAlSi alloy thin film 3 larger in thickness than that required for obtaining a track width of the magnetic head is formed on the side wall 9 of the V-shaped groove by spattering, electron-beam deposition or the like. With the electron-beam deposition, particles contributing to form a film have a uniform direction of an incidence (see FIG. 2(b)); if the direction of an incidence is adequately set, the shadowing effect of a top portion 12 of an adjacent V-shaped groove causes the thin film to be ended near the bottom of the side wall 9 of the V-shaped groove. The soft magnetic alloy thin film 3 generally has a multi-layer configuration including insulating layers of $SiO_2$ or the like, allowing for a frequency region in which the magnetic head 1 works (The configuration is omitted in the drawings).

Then, as shown in FIG. 2(d), the soft magnetic alloy thin film 3 of a gap portion (the top portion 12 of the V-shaped groove) is processed by ion milling to have a thickness required for a track width.

Directions of incident beams are uniform because of the ion milling; if the direction of an incidence of the beams is appropriately set, the soft magnetic alloy thin film 3 is processed to be only in the gap portion 2 (the top portion 12 of the V-shaped groove) utilizing a self-shadowing effect of the top portion 12 of the V-shaped groove.

Through the steps previously mentioned, obtained is a body 13 which includes the soft magnetic alloy thin film 3 only in the gap portion (the top portion 12 of the V-shaped groove) processed to have a thickness required for a track width.

In FIGS. 2(d) and 2(e), a similar ion milling processing is performed in the groove direction; however, if only a portion (front gap portion) of the intended magnetic head 1 facing to the surface at which the magnetic head 1 slides against a magnetic recording medium is processed by ion milling with a mask of a band structure, the soft magnetic alloy thin film 3 can be larger in thickness in the back gap portion. Thus, this is advantageous in an accuracy of alignment and reproducing efficiency.

Figure 2F:
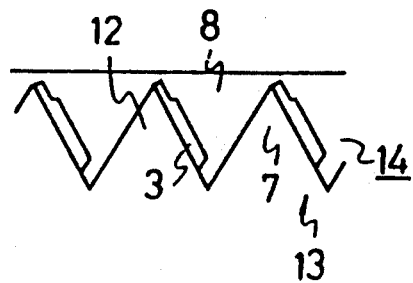

After a metal thin film (not shown) of Cr, for example, to improve wetting by a protection film of $SiO_2$ or the like is formed on the surface of the body 13 having the soft magnetic alloy thin film 3 processed only in the gap portion (the top portion 12 of the V-shaped groove), a V-shaped groove 11 is filled with low melting point glass 8 to obtain a core block 14 (see FIG. 2(f)).

Figure 2G:
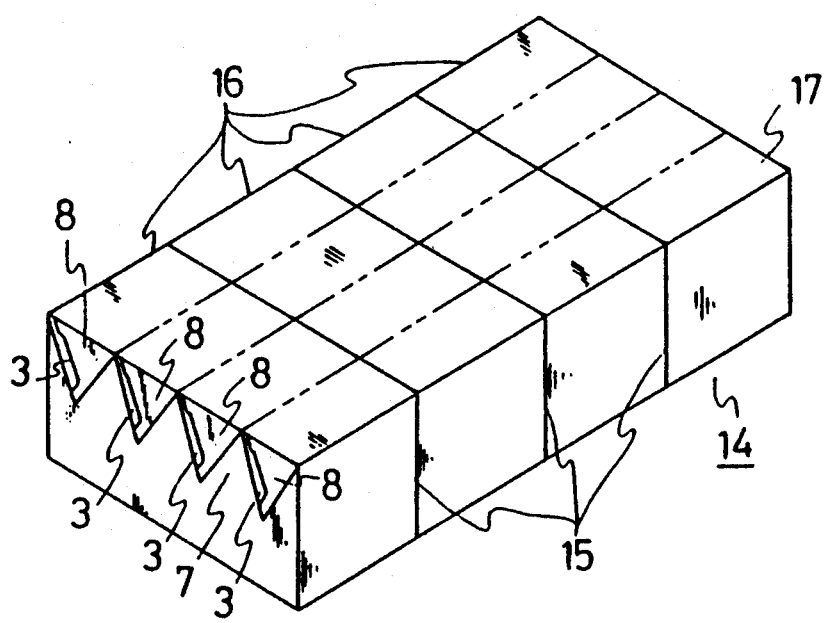

Then, as shown in FIG. 2(g), the core block 14 is cut at planes 15 orthogonal to both the bottom surface of the substrate and the longitudinal direction of the V-shaped groove into core pieces 16. In FIG. 2(g), the core block 14 is divided into four pieces to simplify the drawing, but it is practically divided into a larger number of pieces.

Figure 2H:
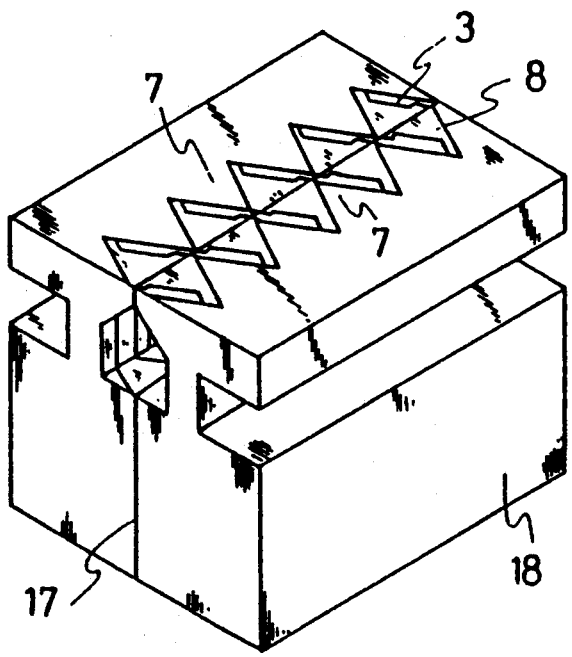

The core pieces 16 thus obtained are subjected to a process similar to a processing of a well-known VCR ferrite head, i.e., a formation of a groove to be a window for coil winding, a precise polishing of a plane facing onto the gap and a formation of a gap spacer. At this time, the plane facing onto the gap is numbered by 17 in FIG. 2(g). After that, as shown in FIG. 2(h), the core pieces 16 are paired and fixed by putting pressure, being aligned with each other, where portions of the soft magnetic alloy thin film 3 exposed to the plane 17 facing onto the gap are opposed to each other; under such conditions, the temperature is raised to the point at which the low melting point glass 8 becomes adhesive to implement glass bonding. Thus, a magnetic head core block 18 is formed. The magnetic head core block 18 is compsed of a number of magnetic head chips 19 connected together, and it is divided into the individual magnetic head chips 19 through a process mentioned below.

Figure 2I:
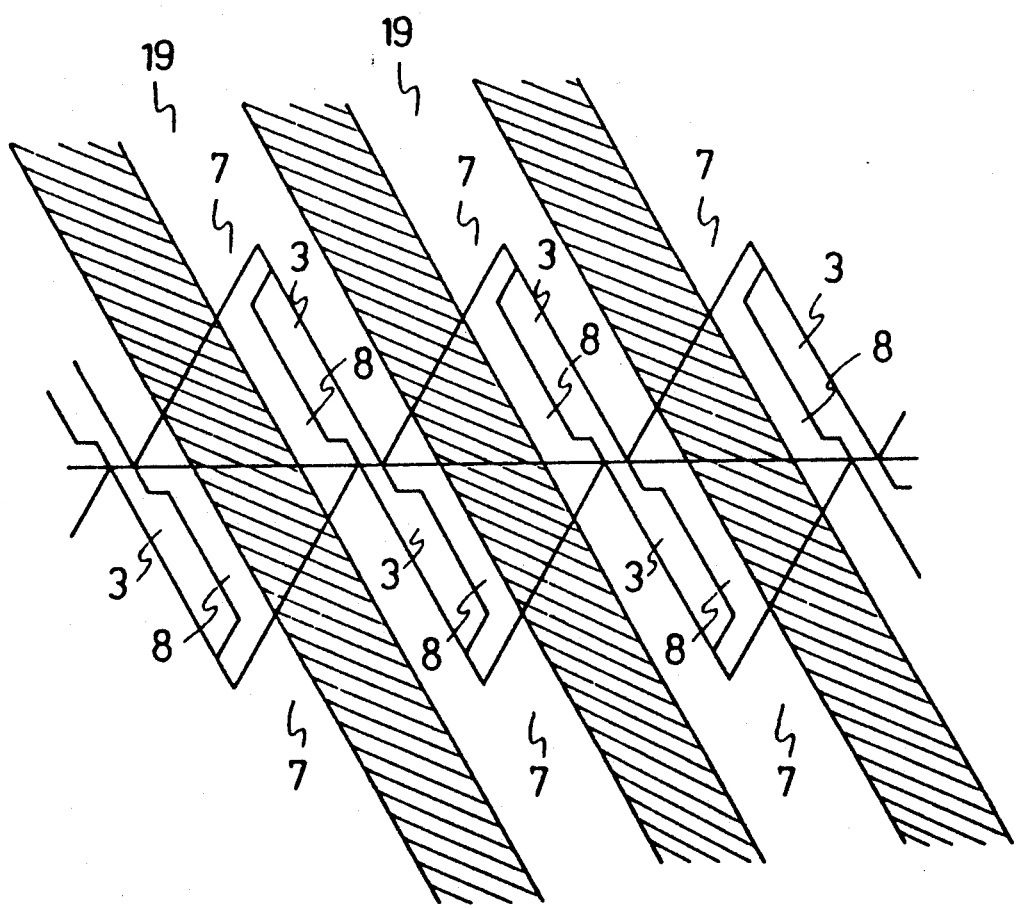

As shown in FIG. 2(i), the magnetic head core block 18 is divided at a hatched portion as a margin to cut off. Depending upon a configuration and pitch of the V-shaped groove 11, it is likely that the cross section is not in parallel with the soft magnetic alloy thin film 3 as is recognized in the drawing.

The magnetic head chip 19 obtained as mentioned above is, similar to a prior art magnetic head, glued to a base plate and wound with coil and eventually subjected to a tape polishing to finish the magnetic head 1.

Figure 3A:
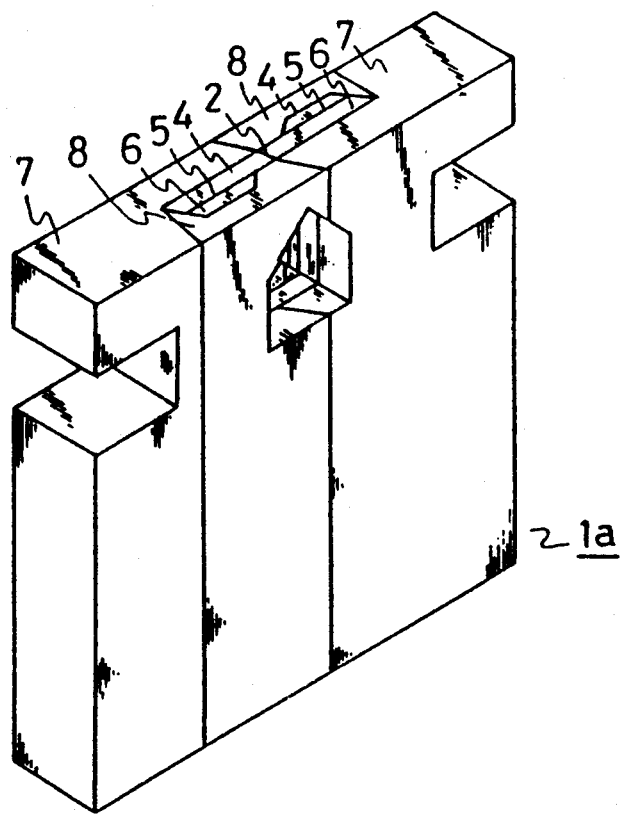
FIGS. 3(a) and 3(b) are perspective views showing magnetic heads of another embodiment according to the present invention.
Figure 3B:
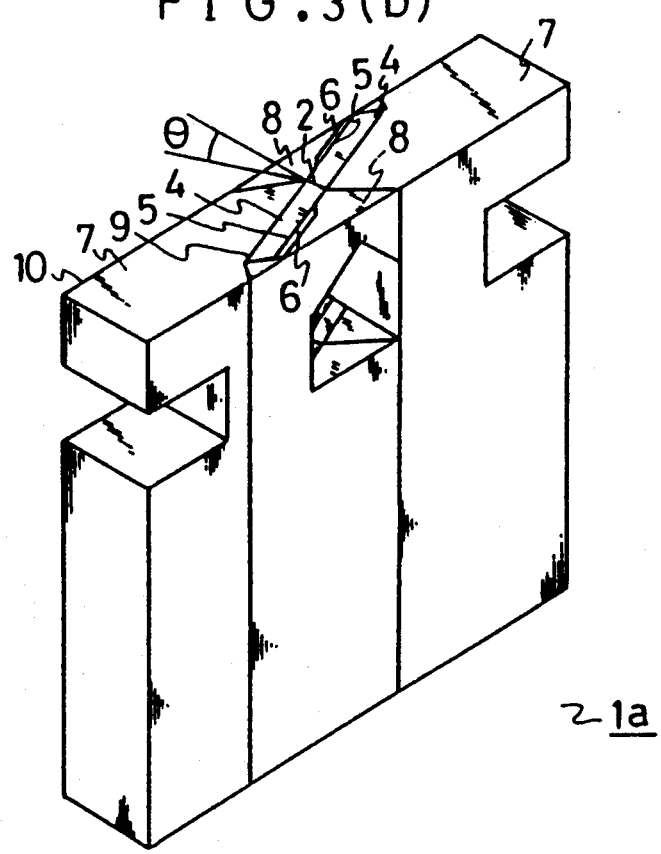

FIGS. 3(a) and 3(b) are perspective views showing other embodiments of the magnetic head obtained in the manufacturing method according to the present invention. In these drawings, a thickness and an area around a gap 2 are enlarged as in FIG. 1. Members corresponding to those in FIG. 1 are denoted by like reference numerals.

As shown in FIG. 3(a), a soft magnetic alloy thin film 3 of FeAlSi is formed only of a first soft magnetic alloy thin film 4 of a thickness required for a track width in a gap portion 2, while it is more thicker in other parts having a second soft magnetic alloy thin film 6 deposited on a thin film 5 of metal (e.g., Ti) serving as a mask against an ion milling.

On the other hand, as an overall structure, a soft magnetic alloy thin film 3a (a multi-layer body of the first soft magnetic alloy thin film 4, the metal thin film 5 serving as a mask against the ion milling and the second soft magnetic alloy thin film 6 is referred to as "soft magnetic alloy thin film 3a" hereinafter) is placed between a nonmagnetic substrate 7 of crystalline glass and low melting point glass 8 equivalent in abrasion to the nonmagnetic substrate 7. Depending upon the shape and pitch of a V-shaped-groove later mentioned, as shown in FIG. 3(b), a plane 9 where the soft magnetic thin film 3a is formed and an edge line 10 of an upper portion of the magnetic head get slanted. The gap 2 is bonded by the low melting point glass 8. Coiling wire wound around the magnetic head 1a and a gap spacer are omitted in the drawings.

Then, a method of manufacturing the magnetic head 1a will be explained with reference to FIGS. 4(a) through 4(i).

Figure 4A:
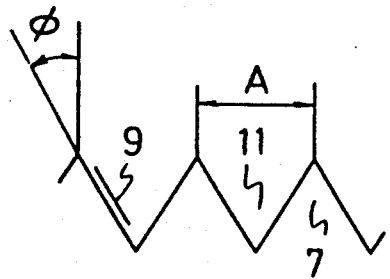
FIGS. 4(a) through 4(i) are diagrams for explaining the embodiment according to the present invention.

As shown in FIG. 4(a), similar to the previous embodiment, a parallel V-shaped groove 11 is formed in the surface of a substrate 7 of crystalline glass with a pitch A allowing for an eventual thickness of the intended magnetic head and a margin to cut off. An angle $\phi$ between a side wall 9 of the V-shaped groove 11 where the soft magnetic alloy thin film 3 serving as a core is to be formed and a normal line in the initial surface of the substrate 7, and the pitch A are determined by the width of the core required for the intended magnetic head 1 and an azimuth.

Figure 4D:
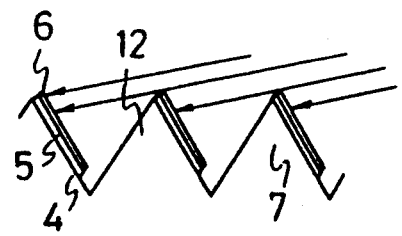
Figure 4B:
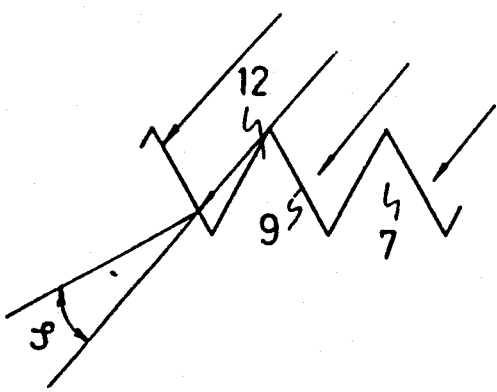
Figure 4E:
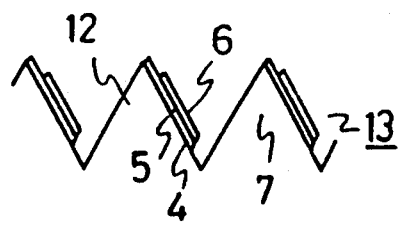
Figure 4C:
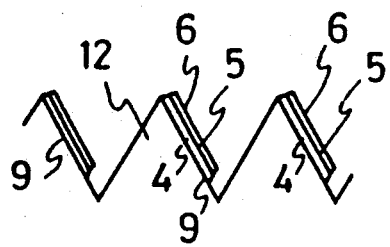

Then, as shown in FIG. 4(c), a first FeAlSi ally thin film 4 required for obtaining a track width of the magnetic head, a metal thin film 5 (e.t., Ti) serving as a mask against the ion milling, and a second FeAlSi alloy thin film 6 are formed in this order in the side wall 9 of the V-shaped groove by spattering, electron-beam deposition or the like. With the electron-beam deposition, particles contributing to form a film have a uniform direction of an incidence (see FIG. 4(b)); if the moving direction is adequately set, the shadowing effect of a top portion 12 of an adjacent V-shaped groove causes the thin film to be ended near the bottom of the side wall 9 of the V-shaped groove. The first and second FeAlSi alloy thin films 4, 6 generally have a multi-layer configuration including insulating layers of $SiO_2$ or the like, allowing for a frequency region in which the magnetic head 1 works (The configuration is omitted in the drawings). The metal thin film 5 serving as a mask against the ion milling should be 1 $\mu$m or under.

Then, as shown in FIG. 4(d), the second soft magnetic alloy thin film 6 of a gap portion (the top portion 12 of the V-shaped groove) is processed by ion milling to have a thickness required for a track width.

Directions of incident beams are uniform because of the ion milling; if the direction of an incidence of the beams is appropriately set, the second soft magnetic alloy thin film 6 only in the gap portion 2 (the top portion 12 of the V-shaped groove) can be removed utilizing a self-shadowing effect of the top portion 12 of the V-shaped groove.

Furthermore, since the metal thin film 5 serving as a mask against the ion milling is formed on the first soft magnetic alloy thin film 4, setting the condition of slight overmilling even if there is found slight unevenness in milling rate enables the second soft magnetic alloy thin film 6 alone to be removed without any unevenness; therefore, a uniform track width determined by a thickness of the first soft magnetic alloy thin film 4 can be obtained.

Through the steps previously mentioned, obtained is a body 13 which has the second soft magnetic alloy thin film 6 only in the gap portion (the top portion 12 of the V-shaped groove) removed as shown in FIG. 4(e).

In FIGS. 4(d) and 4(e), similar ion milling processing is performed in the groove direction; however, if only a portion (front gap portion) of the intended magnetic head 1 facing to the surface at which the magnetic head 1 slides against a magnetic recording medium is processed by ion milling with a mask of a band structure, the soft magnetic alloy thin film 3a can be larger in thickness in the bakc gap portion. Thus, this is advantageous in an accuracy of alignment and reproducing efficiency.

Figure 4F:
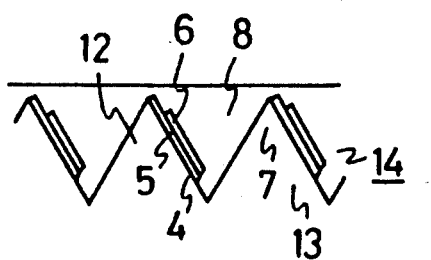

After a metal thin film (not shown) of Cr, for example, to improve wetting by a protection film of $SiO_2$ or the like is formed on the surface of the body 13 having the second soft magnetic alloy thin film 6 removed only in the gap portion (the top portion 12 of the V-shaped groove), a V-shaped groove 11 is filled with low melting point glass 8 to obtain a core block 14 (see FIG. 4(f)).

Figure 4G:
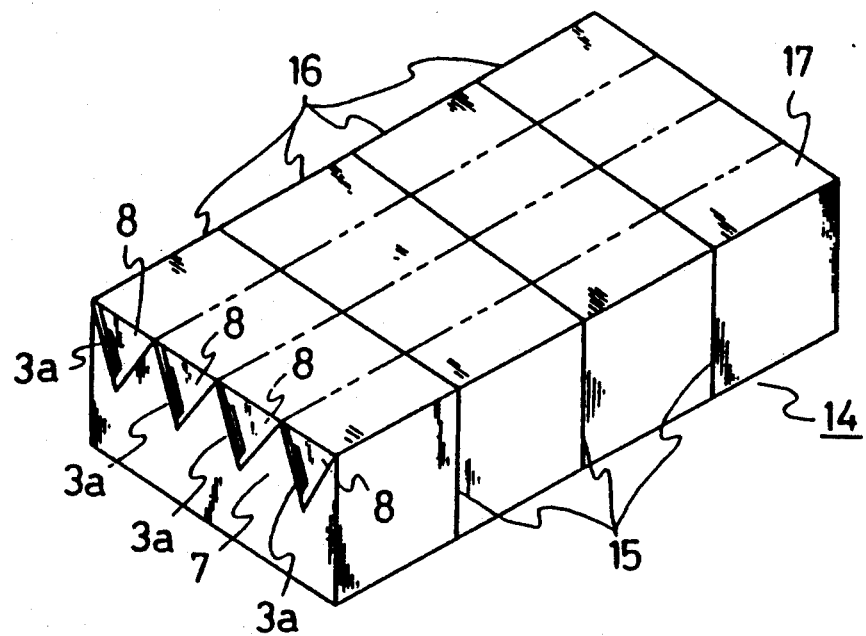

Then, as shown in FIG. 4(g), the core block 14 is cut at planes 15 orthogonal to both the bottom suface of the substrate and the longitudinal direction of the v-shaped groove into core pieces 16. In the drawing, the core block 14 is divided into four pieces to simplify the drawing, but it is practically divided into a larger number of pieces.

Figure 4H:
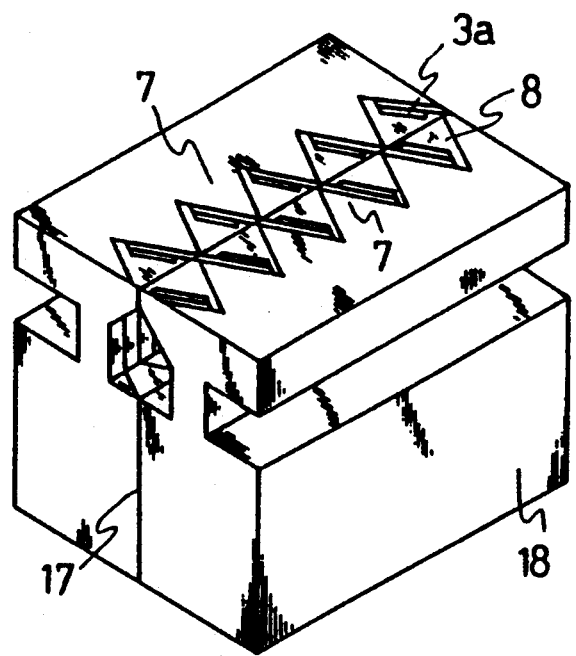

The core pieces 16 thus obtained are subjected to a process similar to a processing of a well-known VCR ferrite head, i.e., a formation of a groove to be a window for coil winding, a precise polishing of a plane facing onto the gap and a formation of a gap spacer. At this time, the plane facing onto the gap is numbered by 17 in FIG. 4(g). After that, as shown in FIG. 4(h), the core pieces 16 are paired and fixed by putting pressure, being aligned with each other, where portions of the first soft magnetic alloy thin film 4 exposed to the plane 17 facing onto the gap are opposed to each other; under such conditions, the temperature is rasied to the point at which the low melting point glass 8 becomes adhesive to implant glass bonding. Thus, a magnetic head core block 18 is formed. The magnetic head core block 18 is composed of a number of magnetic head chips 19 connected together, and it is divided into the individual magnetic head chips 19 through a process mentioned below.

Figure 4I:
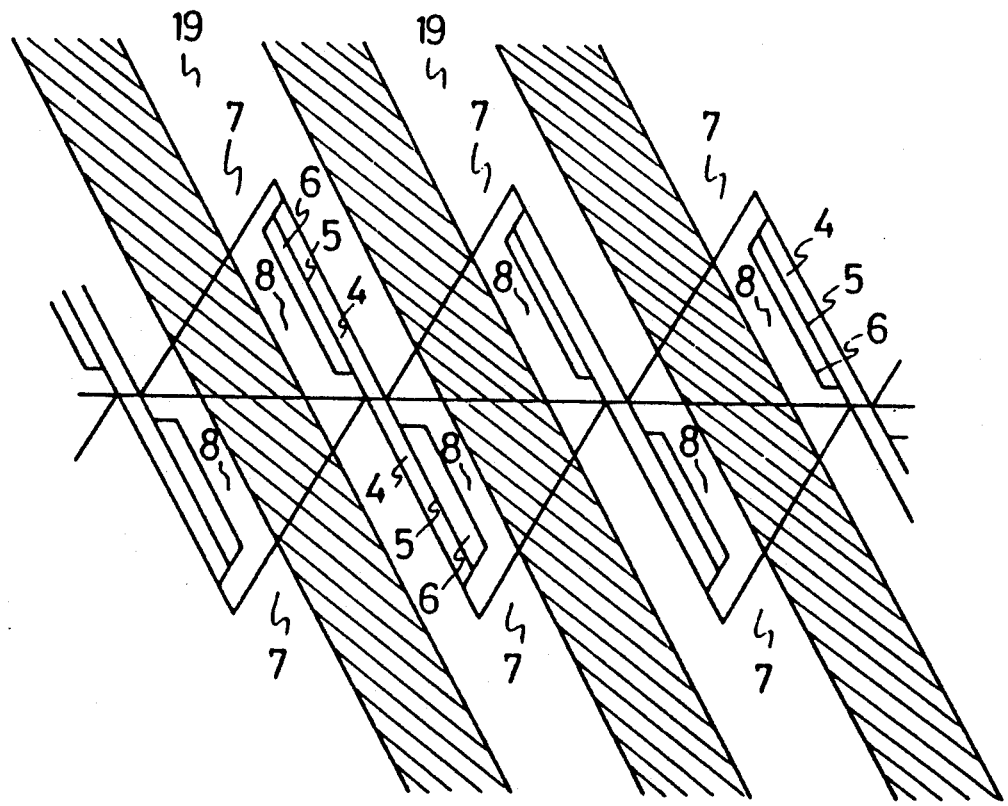
Figure 5:
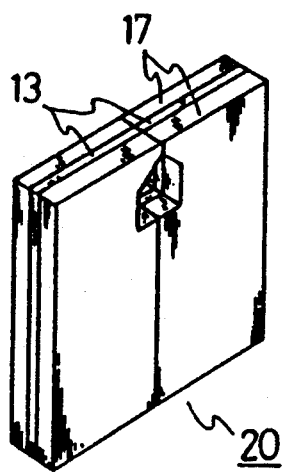
FIG. 5 is a perspective view showing a prior art magnetic head.
Figure 6A:
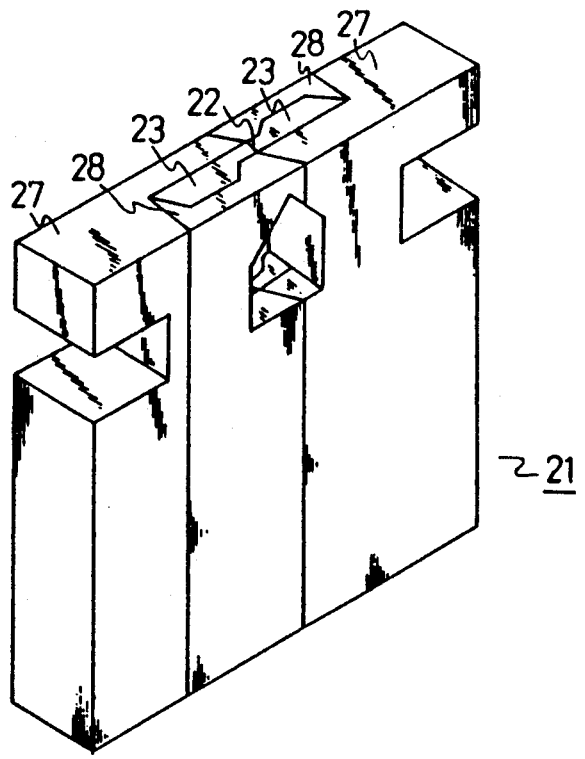
FIGS. 6(a) and 6(b) are perspective views showing magnetic heads disclosed in Japanese Unexamined Patent Publication No. 33709/1989.
Figure 6B:
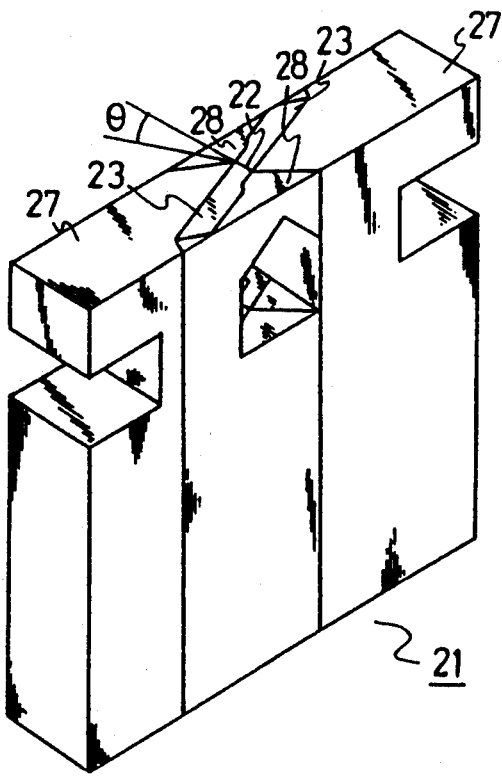
Figure 7A:
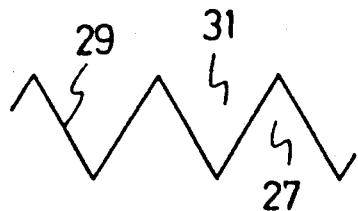
FIGS. 7(a) through 7(h) are diagrams for explaining a manufacturing process of a magnetic head disclosed in Japanese Unexamined Patent Publication No. 33709/1989.
Figure 7B:
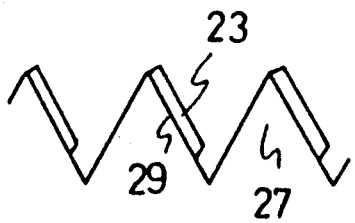
Figure 7C:
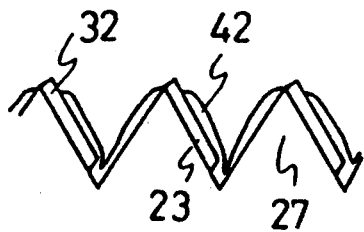
Figure 7D:
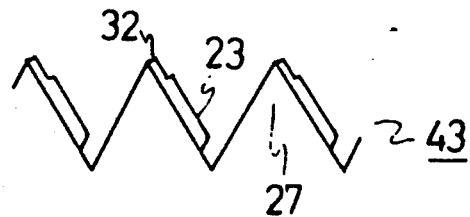
Figure 7E:
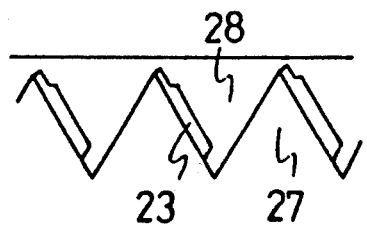
Figure 7F:
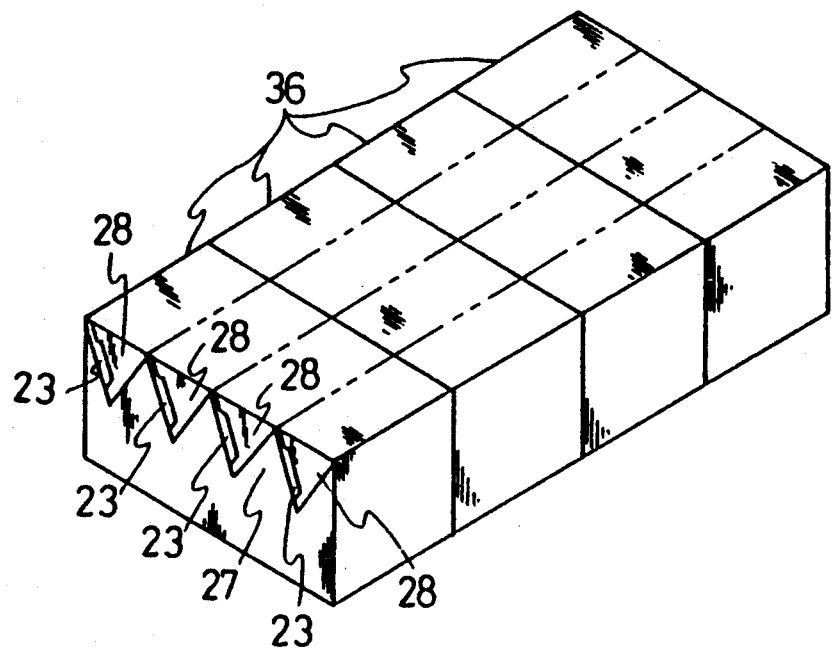
Figure 7G:
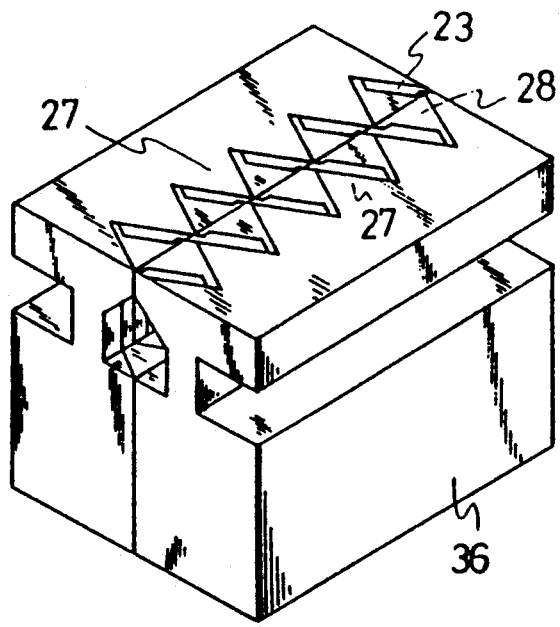
Figure 7H:
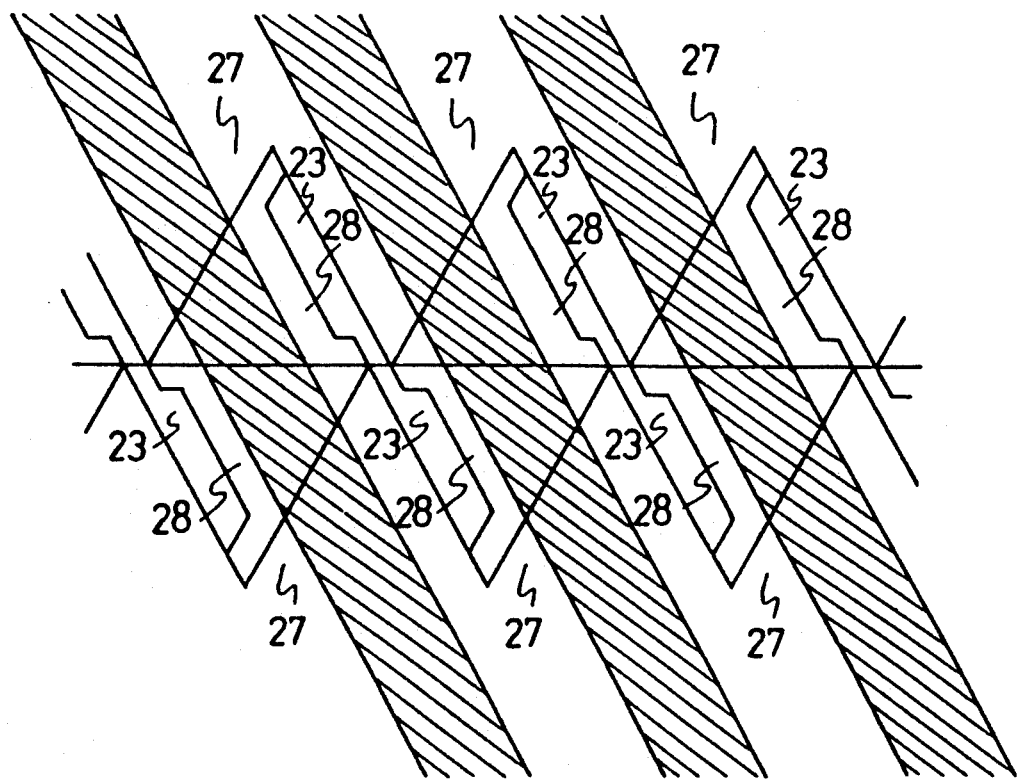

As shown in FIG. 4(i), the magnetic head core block 18 is divided at a hatched portion as a margin to cut off. Depending upon a configuration and pitch of the V-shaped groove 11, it is likely that the cross section is not in parallel with the soft magnetic alloy thin film 3a as is recognized in the drawing.

The magnetic head chip 19 obtained as mentioned above is, similar to a prior art magnetic head, glued to a base plate and wound with coil and eventually subjected to a tape polishing to finish the magnetic head 1a.

According to the present invention, an ion milling is employed for processing a soft magnetic thin film at a top portion of groove walls to be a gap portion and a self shadowing effect of the top portion of the groove walls is utilized; hence, process steps such as a coating of resist, an exposure to light, a development and the like can be omitted, and a deterioration of precessing accuracy caused in such steps can be avoided.

With regard to a magnetic head with a small track witdth, it can cope with a high-density recording and wide-band signal processing in a magnetic recording because its magnetic core is throughly formed of soft magnetic thin flim and efficiency is secured.

What is claimed is:

1. A method of manufacturing a magnetic head comprising the steps of:

forming a plurality of parallel grooves in a surface of a substrate, each groove including two groove walls, each wall extending from a top portion to a bottom of the groove;

forming a soft magnetic thin film larger in thickness than that required for a track width on one wall of each of said grooves;

processing said soft magnetic film at the top portion of the groove walls to a thickness required for the track width by ion milling utilizing a self-shadowing effect of the top portion of the groove walls;

filling said grooves with nonmagnetic substance; and performing a finishing process for completing a magnetic head.

2. A method according to claim 1, wherein said finishing process includes the steps of:

cutting said substrate in the direction orthogonal to said grooves with a specified pitch and polishing the surface of the filling nonmagnetic substance into a plane identical in level to the surface of said substrate to make a core piece;

after forming a window for coil winding and a gap plane in said core piece, bonding two of core pieces at their respective surfaces of the filling nonmagnetic substance to make a core block with cutting sections of said soft magnetic thin film aligned with each other;

cutting said core block into magnetic head chips; and coiling wire around said magnetic head chips 3. A method according to claim 1, wherein said substrate is a nonmagnetic substrate of crystalline glass.

4. A method according to claim 1, wherein said soft magnetic thin film is an FeAlSi alloy thin film.

5. A method according to claim 1, wherein said soft magnetic thin film has multi-layer configuration including insulating layers.

6. A method according to claim 1, wherein said nonmagnetic substance is a glass of low melting point.

7. A method according to claim 1, wherein said soft magnetic thin film is a soft magnetic thin film multi-layer body comprising a first FeAlSi alloy thin film of a thickness required for the track width, a metal thin film serving as a mask against the ion milling and a second FeAlSi alloy thin film, said films being overlaid with one another in this order.

8. A method according to claim 7, wherein said metal thin film is titanium thin film.

9. A method according to claim 1, wherein said step of forming said magnetic thin film is performed by an electron-beam deposition in which by properly setting an incident direction of vapor deposition particles, a shadowing effect by the top portion of an adjacent groove wall causes said soft magnetic thin film to be deposited on said one wall of the groove except on a portion of said one wall adjacent the bottom of the groove.

10. A method according to claim 7, wherein said step of forming said soft magnetic thin film multi-layer body is performed by an electron beam deposition in which by properly setting an incident direction of vapor deposition particles, a shadowing effect by the top portion of an adjacent groove wall causes said soft magnetic thin film multi-layer body to be deposited on said one wall of the groove except on a portion of said one wall adjacent the bottom of the groove.

11. A method according to claim 7, wherein said thin film processing step by ion milling includes the step of removing the second FeAlSi alloy thin film in the top portion pf the groove wall utilizing the self-shadowing effect in the top portion of the groove wall.

12. A method according to claim 1, wherein said thin film processing step by ion milling includes the step of processing merely a side serving as a recording medium sliding face of the intended magnetic head, using a mask of a band structrue.

13. A method according to claim 7, wherein said thin film processing step by ion milling includes the step of processing merely a side serving as a recording medium sliding face of the intended magnetic head, using a mask of a band structrue.

* * * * *